United States Patent
Hirase et al.

(10) Patent No.: US 7,006,156 B2
(45) Date of Patent: Feb. 28, 2006

(54) IMAGE DATA OUTPUT DEVICE AND RECEIVING DEVICE

(75) Inventors: Katsunori Hirase, Neyagawa (JP); Eiji Nakayama, Osaka (JP); Tatsuo Hiramatsu, Kadoma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 478 days.

(21) Appl. No.: 09/977,459

(22) Filed: Oct. 16, 2001

(65) Prior Publication Data

US 2002/0047851 A1 Apr. 25, 2002

(30) Foreign Application Priority Data

Oct. 19, 2000 (JP) .............................. 2000-319216

(51) Int. Cl.
*H04N 9/74* (2006.01)
(52) U.S. Cl. ........................................ 348/600; 348/565
(58) Field of Classification Search ................ 348/600, 348/589, 588, 586, 587, 598, 584, 599, 565; 702/189, 194, 199, 198; 345/629, 639, 640, 345/660
See application file for complete search history.

(56) References Cited

U.S. PATENT DOCUMENTS

| | | | | |
|---|---|---|---|---|
| 5,541,666 A | * | 7/1996 | Zeidler et al. | 348/589 |
| 5,781,241 A | * | 7/1998 | Donovan | 348/441 |
| 5,838,387 A | * | 11/1998 | Allen et al. | 348/581 |
| 5,912,710 A | | 6/1999 | Fujimoto | |
| 5,953,691 A | * | 9/1999 | Mills | 702/198 |
| 6,121,978 A | * | 9/2000 | Miler | 345/629 |
| 6,133,960 A | | 10/2000 | Mendenhall | |
| 6,157,415 A | * | 12/2000 | Glen | 348/599 |
| 6,310,659 B1 | * | 10/2001 | Glen | 348/589 |
| 6,330,002 B1 | * | 12/2001 | Yamada | 345/629 |
| 6,493,038 B1 | * | 12/2002 | Singh et al. | 348/565 |
| 6,587,155 B1 | * | 7/2003 | Xue | 348/595 |
| 6,678,006 B1 | * | 1/2004 | Velez et al. | 348/564 |
| 6,700,588 B1 | * | 3/2004 | MacInnis et al. | 345/629 |

* cited by examiner

*Primary Examiner*—Paulos M. Natnael
(74) *Attorney, Agent, or Firm*—Armstrong, Kratz, Quintos, Hanson & Brooks, LLP (57) ABSTRACT

Image data scaled by a scaling circuit and then multiplied by a weighting factor by a weighting factor multiplier circuit and an on-screen-display (OSD) data multiplied by a weighting factor by a weighting factor multiplier circuit and then scaled by a scaling circuit are combined together by a combining circuit to generate composite image data and the resultant composite image data is accordingly reproduced.

17 Claims, 7 Drawing Sheets

IMAGE DATA OUTPUT DEVICE AND RECEIVING DEVICE

BACKGROUND OF THE INVENTION

1. Field of the Invention

The present invention relates to structures of an image data output device and a receiving device by which image data is scaled for scaling up or down an image to be displayed. More specifically, the invention relates to structures of an image data output device and a receiving device combining data for OSD (On Screen Display, the data hereinafter referred to as "OSD data") with image data to output the resultant composite image.

2. Description of the Background Art

Recent digital broadcasting, for example, employs the "on screen display" technique for displaying, on a screen of a television receiver, an operational menu constituted of characters, graphics and the like superimposed on an image for a broadcast program displayed on the screen. Such OSD data provides an image of an EPG (Electronic Program Guide) for example. Then, an image data output device has recently been developed including an OSD device for displaying any image other than a broadcast program image, that is produced from the OSD data, on a display unit together with the broadcast program image. Image data supplied from this image data output device is required to undergo scaling according to the resolution of the display unit for both of image data for the broadcast program image (hereinafter called "moving image data") and OSD data.

For a pixel position where the OSD data is provided, the moving image data and OSD data are each weighted and then added together so that the resultant composite data is reproduced.

Figure 7:
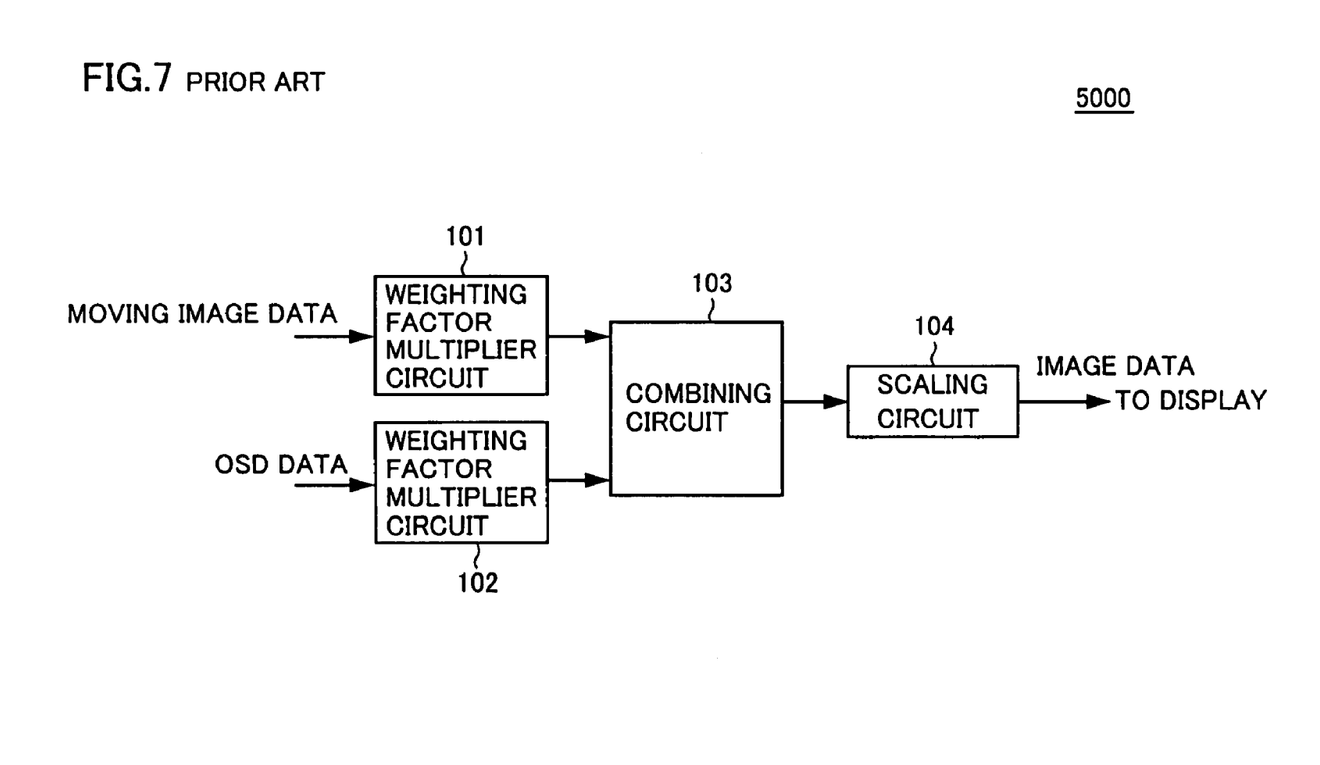
FIG. 7 is a block diagram showing an internal structure of a conventional image data output device 5000.

FIG. 7 shows a structure of a conventional image data output device 5000.

A broadcast signal received by a tuner (not shown) is separated by a demultiplexer (not shown) into moving image data and OSD data to be supplied to image data output device 5000 shown in FIG. 7.

Image data output device 5000 includes a weighting factor multiplier circuit 101 multiplying the moving image data by weighting factor (1−α), a weighting factor multiplier circuit 102 multiplying the OSD data by weighting factor α, a combining circuit 103 adding the moving image data to the OSD data that are multiplied by respective weighting factors by weighting factor multiplier circuits 101 and 102, and a scaling circuit 104 performing scaling on the composite data formed of the moving image data and OSD data produced by combining circuit 103, the scaling being performed according to the resolution of a display unit (not shown) on which the image is reproduced.

It is supposed here that the moving image data and OSD data are to be presented on display units of the same resolution.

In this way, conventional image data output device 5000 as shown in FIG. 7 firstly performs, by weighting factor multiplier circuits 101 and 102 and combining circuit 103, the weighting addition for the moving image data and OSD data. Then, the resultant image data having undergone the weighting addition is scaled according to the resolution of the display unit and then output.

Figure 8:
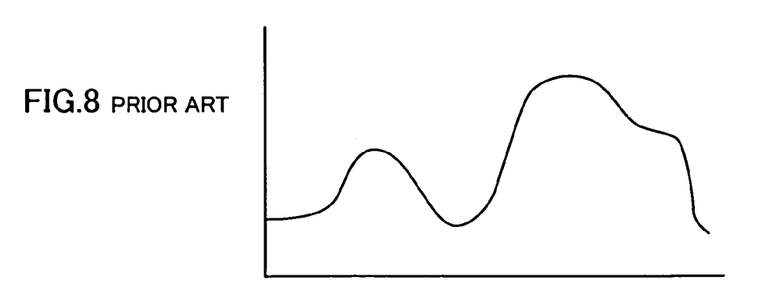
FIG. 8 shows a waveform of moving image data input to a weighting factor multiplier circuit 101.
Figure 9:
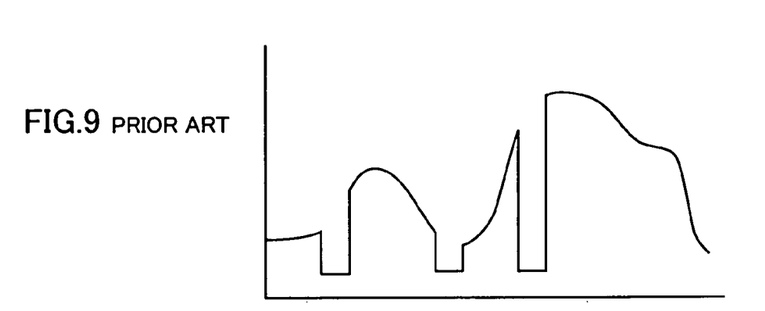
FIG. 9 shows a waveform of the moving image data for a pixel position for which OSD data is supplied that has been multiplied by a weighting factor by the weighting factor multiplier circuit 101.

FIG. 8 shows a waveform of the moving image data supplied to weighting factor multiplier circuit 101, and FIG. 9 shows a waveform of the moving image data having been multiplied by the weighting factor by weighting factor multiplier circuit 101 at a pixel position where the OSD data is supplied.

For conventional image data output device 5000 as described above, the moving image data as shown in FIG. 8 is multiplied by the weighting factor by weighting factor multiplier circuit 101 and the resultant moving image data has sharp edges as shown in FIG. 9 on the original moving image data represented by a smooth wave. When the moving image data multiplied by the weighting factor as discussed above undergoes scaling, it is likely that overshoot and undershoot occur at the edges generated on the moving image data. It is thus desirable to perform scaling on the moving image data retaining the smooth wave.

Figure 10:
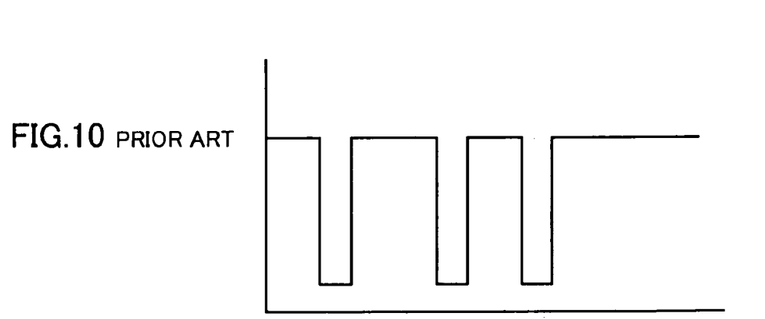
FIG. 10 shows a waveform of OSD data input to a weighting factor multiplier circuit 102.
Figure 11:
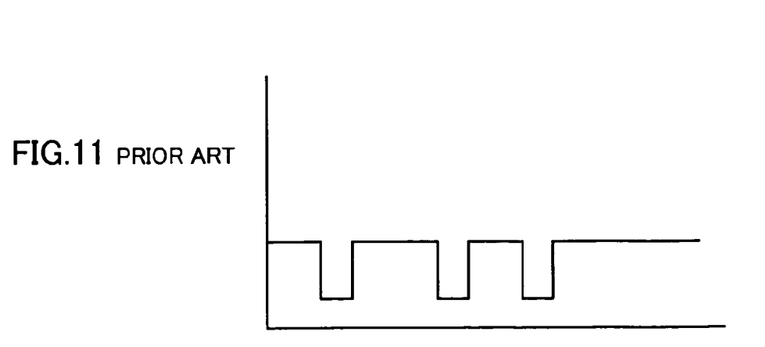
FIG. 11 shows a waveform of the OSD data that has been multiplied by a weighting factor by the weighting factor multiplier circuit 102.

FIG. 10 shows a waveform of the OSD data supplied to weighting factor multiplier circuit 102, and FIG. 11 shows a waveform of the OSD data having been multiplied by the weighting factor by weighting factor multiplier circuit 102.

For the moving image data, the OSD data is provided for displaying characters and the like and has numerous sharp edges as shown in FIG. 10. Therefore, it is desirable to perform scaling on the OSD data having been multiplied by the weighting factor so as to reduce the difference of data amounts of respective edge portions as shown in FIG. 11.

Conventional image data output device 5000 thus suffers from overshoot and undershoot occurring at the edges generated on the moving image data.

SUMMARY OF THE INVENTION

One object of the present invention is to provide an image data output device and a receiving device performing multiplication by weighting factors and scaling separately in separate orders for respective moving image data and data representing characters and graphics such as OSD data.

In summary, the present invention according to one aspect is an image data output device receiving first image data representing a moving image and second image data representing an image including characters and graphics to output an image signal corresponding to a composite image generated by combining the first and second image data, the image data output device including a first image data processing circuit, a second image data processing circuit and a first combining circuit.

The first image data processing circuit scales the first image data and thereafter weights multiplies the scaled first image data. The second image data processing circuit weights the second image data and thereafter scales the weighted second image data. The first combining circuit combines the first image data processed by the first image data processing circuit and the second image data processed by the second image data processing circuit.

Preferably, in the image data output device, a weighting factor used by the first image data processing circuit is scaled according to resolution of an image display unit in order to combine the image data to generate a composite image appropriate for the resolution.

The present invention according to another aspect is an image data output device receiving first image data representing a moving image and second image data representing an image including characters and graphics to output an image signal corresponding to a composite image generated by combining the first and second image data, the image signal being output to represent a plurality of data according to respective resolutions of a plurality of image display units. The image data output device includes a plurality of first scaling circuits, a plurality of weighting factor multiplier circuits, a first combining circuit, a second scaling circuit, and a plurality of second combining circuits.

The first scaling circuits scale the first image data according to respective resolutions of the image display units. The weighting factor multiplier circuits multiply the first image data scaled by the first scaling circuits by respective weighting factors. The first combining circuit receives the second image data for weighting at least one image data constituting the second image data and combining the weighted image data to generate one composite image data. The second scaling circuit scales the composite image data generated by the first combining circuit according to respective resolutions of the image display units. The second combining circuits combine image data supplied respectively from the weighting factor multiplier circuits and image data supplied from the second scaling circuit to generate and output composite image data according to respective resolutions of the image display units.

The present invention according to still another aspect is an image data output device outputting image data as a plurality of data according to respective resolutions of a plurality of image display units. The image data output device includes a plurality of first weighting factor multiplier circuits, a second weighting factor multiplier circuit, a scaling circuit, and a plurality of combining circuits.

The first weighting factor multiplier circuits respectively multiply, by respective weighting factors, first image data to be output respectively for the image display units and representing a moving image. The second weighting factor multiplier circuit multiplies second image data representing an image including characters and graphics by a weighting factor. The scaling circuit scales the image data supplied from the second weighting factor multiplier circuit according to respective resolutions of the image display units. The combining circuits combine image data supplied respectively from the first weighting factor multiplier circuits and image data supplied from the scaling circuit to generate and output composite image data according to respective resolutions of the image display units.

The present invention according to a further aspect is a receiving device including a tuner, a separating unit, a decoding unit, and an image data output device.

The tuner selectively receives a signal transmitting first image data representing a moving image and second image data representing an image including characters and graphics. The separating unit separates the received signal into a signal corresponding to the first image data and a signal corresponding to the second image data. The decoding unit reproduces the first and second image data from an output of the separating unit.

The image data output device receives the first and second image data from the decoding unit to output an image signal corresponding to a composite image generated by combining the first and second image data. The image data output device includes a first image data processing circuit, a second image data processing circuit and a first combining circuit. The first image data processing circuit scales the first image data and thereafter weights the scaled first image data. The second image data processing circuit weights the second image data and thereafter scales the weighted second image data. The first combining circuit combines the first image data processed by the first image data processing circuit and the second image data processed by the second image data processing circuit.

The present invention according to a still further aspect is a receiving device including a tuner, a separating unit, a decoding unit, and an image data output device.

The tuner selectively receives a signal transmitting first image data representing a moving image and second image data representing an image including characters and graphics. The separating unit separates the received signal into a signal corresponding to the first image data and a signal corresponding to the second image data. The decoding unit reproduces the first and second image data from an output of the separating unit.

The image data output device receives the first and second image data from the decoding unit to output an image signal corresponding to a composite image generated by combining the first and second image data, the image signal being output to represent a plurality of data according to respective resolutions of a plurality of image display units. The image data output device includes a plurality of first scaling circuits, a plurality of weighting factor multiplier circuits, a first combining circuit, a second scaling circuit, and a plurality of second combining circuits. The first scaling circuits scale the first image data according to respective resolutions of the image display units. The weighting factor multiplier circuits multiply the first image data scaled by the first scaling circuits by respective weighting factors. The first combining circuit receives the second image data for weighting at least one image data constituting the second image data and combining the image data to generate one composite image data. The second scaling circuit scales the composite image data generated by the first combining circuit according to respective resolutions of the image display units. The second combining circuits combine image data supplied respectively from the weighting factor multiplier circuits and image data supplied from the second scaling circuit to generate composite image data according to respective resolutions of the image display units.

The present invention is accordingly advantageous. Namely, when the image data output device and receiving device as described above receive data representing characters and graphics such as OSD data for displaying EPG or the like and image data for displaying a broadcast program image, first image data like image data which smoothly changes is first scaled and then multiplied by a weighting factor so that the scaling can be performed for the first image data still having the smooth change to prevent image deterioration. Moreover, second image data like data representing characters and graphics having numerous edge portions is first multiplied by a weighting factor and then scaled so that the scaling can be performed for the second image data having reduced differences for edge portions to prevent image deterioration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described in conjunction with the drawings.

First Embodiment

Figure 1:
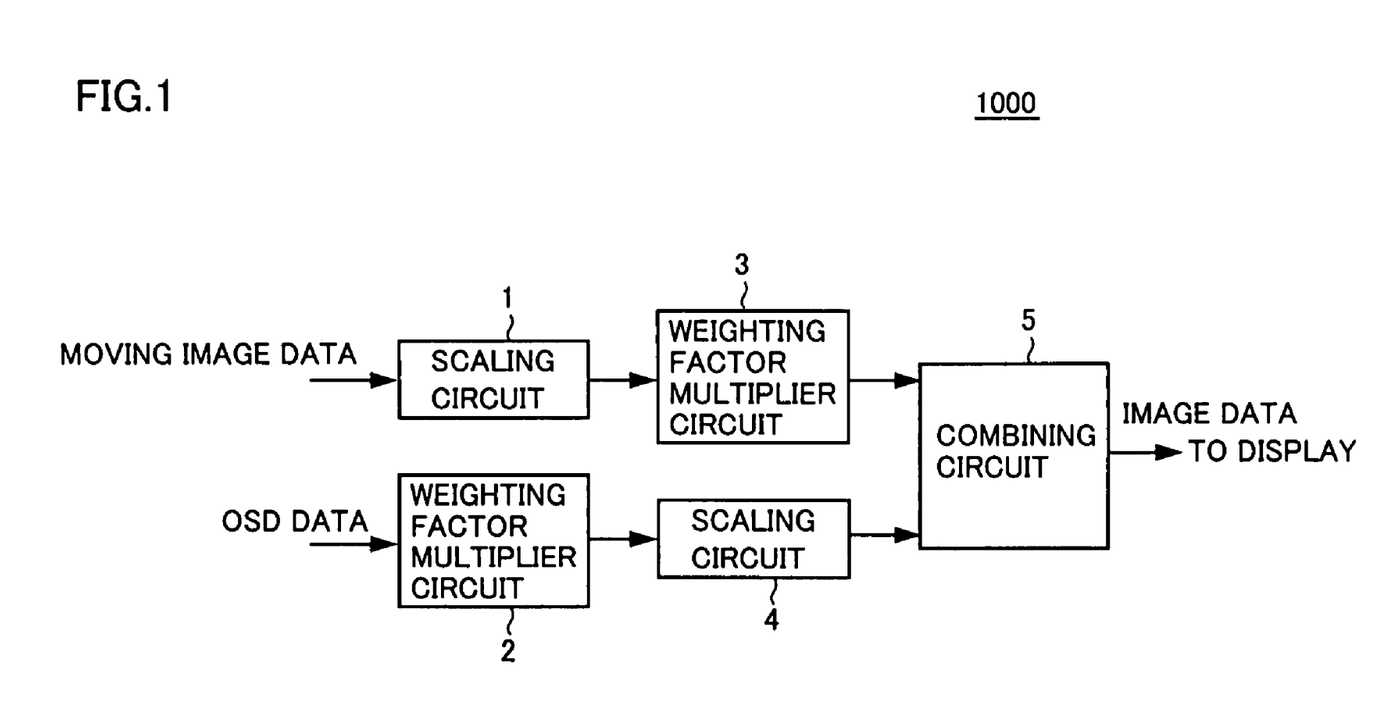
FIG. 1 is a block diagram showing an internal structure of an image data output device 1000 according to a first embodiment of the present invention.

FIG. 1 is a block diagram showing an internal structure of an image data output device 1000 according to a first embodiment of the present invention.

Referring to FIG. 1, image data output device 1000 includes a scaling circuit 1 scaling moving image data according to the resolution of a display unit (not shown) on which an image corresponding to the moving image data is reproduced, a weighting factor multiplier circuit 2 multiplying OSD data by weighting factor $\alpha$, a weighting factor multiplier circuit 3 multiplying the moving image data scaled by scaling circuit 1 by weighting factor $(1-f\alpha)$, a scaling circuit 4 scaling the OSD data multiplied by the weighting factor by weighting factor multiplier circuit 2, and a combining circuit 5 adding the moving image data supplied from weighting factor multiplier circuit 3 to the OSD data supplied from scaling circuit 4 to generate image data.

It is noted that f in the weighting factor $(1-f\alpha)$ has a value determined according to the resolution of the display unit on which an image is reproduced and varies depending on the magnification used for the scaling by scaling circuit 1.

Suppose that the image data output device of the structure described above is provided to a receiving device for digital broadcasting, for example. A broadcast signal having OSD data is received by a tuner and then separated by a demultiplexer into OSD data and moving image data. The resultant moving image data and OSD data are supplied through different blocks respectively to image data output device 1000 structured as shown in FIG. 1. The structure and operation of the receiving device will be described later.

In this way, the moving image data and OSD data are provided to image data output device 1000 and the moving image data is first scaled by scaling circuit 1 according to the resolution of a display unit on which an image is reproduced. Scaling circuit 1 then performs interpolation or the like to generate moving image data of a pixel position without data, by means of a plurality of moving image data of surrounding pixel positions. The resultant moving image data is accordingly scaled. The moving image data scaled by scaling circuit 1 is supplied to weighting factor multiplier circuit 3.

Weighting factor multiplier circuit 3 multiplies moving image data of a pixel position, where an image derived from OSD data is displayed, by weighting factor $(1-f\alpha)$. In other words, moving image data of a pixel position where no image derived from OSD data is displayed is directly output while moving image data of a pixel position where an image derived from OSD data is displayed is multiplied by the weighting factor. The moving image data thus multiplied by the weighting factor is provided to combining circuit 5.

The OSD data is first multiplied by weighting factor $\alpha$ by weighting factor multiplier circuit 2. Then, the OSD data multiplied by the weighting factor is supplied to scaling circuit 4 and scaled according to the resolution of the display unit on which an image is reproduced. Scaling circuit 4 also performs interpolation or the like to generate OSD data of a pixel position without data, by means of OSD data of surrounding pixel positions, and the resultant OSD data is scaled. The scaled OSD data is then provided to combining circuit 5.

The moving image data from weighting factor multiplier circuit 3 and the OSD data from scaling circuit 4 are supplied to combining circuit 5 in synchronization with each other so that the moving image data and OSD data for the same pixel position are provided to combining circuit 5. Combining circuit 5 accordingly outputs only moving image data as image data for a pixel position where no image derived from OSD data is displayed and outputs composite data, which has been produced by adding OSD data to moving image data, as image data for a pixel position where an image derived from OSD data is displayed. Then, the image derived from OSD data is displayed with a darkened background.

According to the structure as described above, smoothly changing image data like the moving image data is scaled first and subsequently multiplied by a weighting factor. Therefore, when the moving image data is scaled, the moving image data has a smaller number of edge portions than image data which has been multiplied by the weighting factor. In this way, deterioration of an image such as overshoot and undershoot can be lessened. Moreover, image data having numerous edge portions like the OSD data is first multiplied by a weighting factor and subsequently scaled. Therefore, when the OSD data is scaled, the OSD data has a smaller difference of data values for edge portions than that of OSD data scaled before the weighting factor is multiplied. It is thus possible to lessen image deterioration by reducing overshoot and undershoot values for example.

Second Embodiment

A second embodiment of the present invention is described below in conjunction with FIG. 2.

Figure 2:
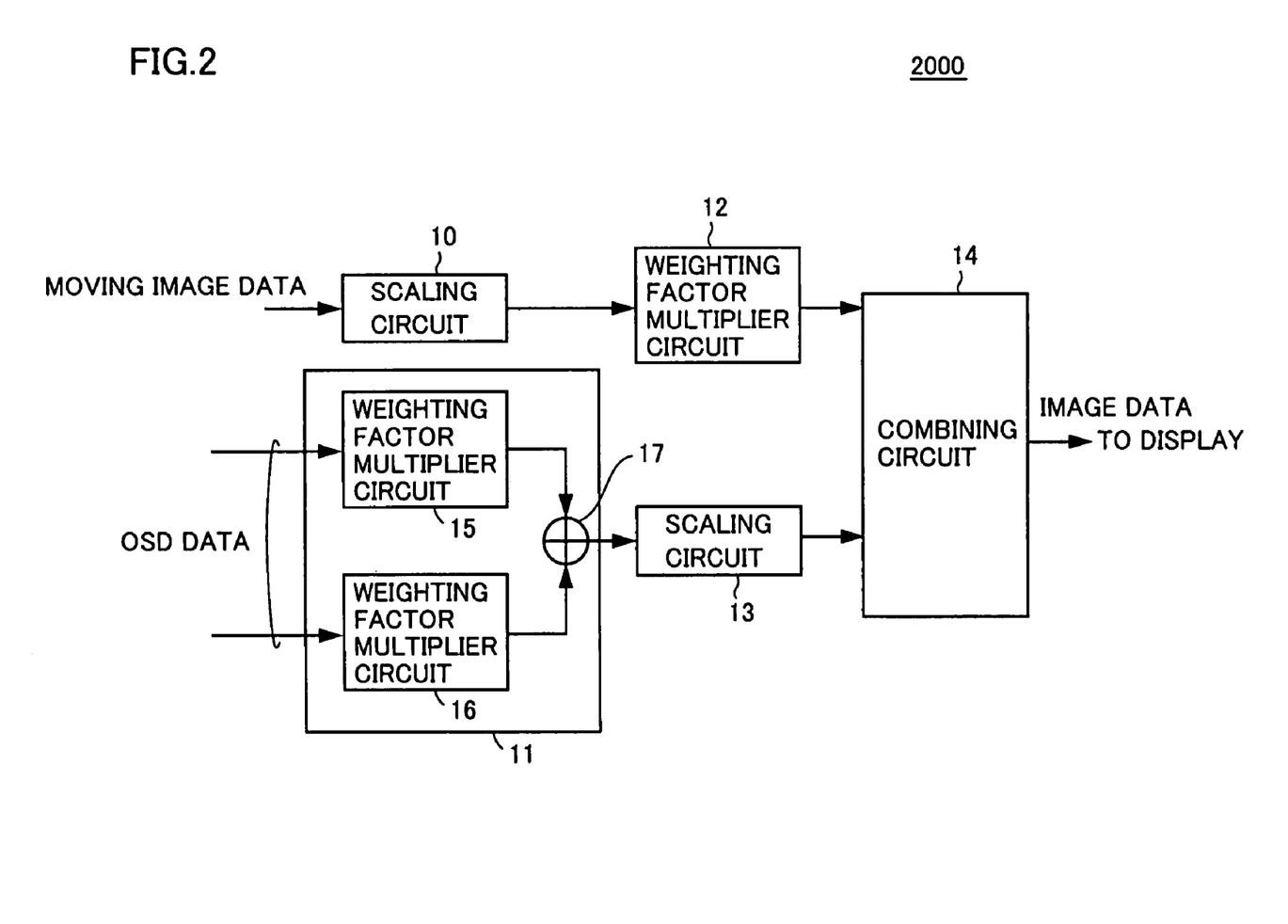
FIG. 2 is a block diagram showing an internal structure of an image data output device 2000 according to a second embodiment of the present invention.

FIG. 2 is a block diagram showing an internal structure of an image data output device 2000 according to the second embodiment of the present invention. Image data output device 2000 in FIG. 2 has components used for the same purpose as that of the image data output device in FIG. 1. Such components common to the devices in FIGS. 1 and 2 are denoted by the same reference character and detailed description thereof is not repeated here.

Image data output device 2000 in FIG. 2 includes a scaling circuit 10 scaling moving image data according to the resolution of a display unit on which an image is reproduced, an OSD data combining circuit 11 multiplying a plurality of OSD data by weighting factors and combining OSD data into composite data, a weighting factor multiplier circuit 12 multiplying the moving image data scaled by scaling circuit 10 by a weighting factor, a scaling circuit 13 scaling the composite OSD data generated by OSD data combining circuit 11, and a combining circuit 14 adding the moving image data supplied from weighting factor multiplier circuit 12 to the OSD data supplied from scaling circuit 13 to generate image data. It is assumed that two OSD data are supplied to OSD data combining circuit 11 for the purpose of allowing the following description of the embodiment to be readily understood.

OSD data combining circuit 11 includes weighting factor multiplier circuits 15 and 16 to which two OSD data respectively representing separate two images are supplied, and an adder circuit 17 calculating a sum of the two OSD data multiplied by respective weighting factors by weighting factor multiplier circuits 15 and 16.

In image data output device 2000 having the above-described structure, OSD data representing an image to be displayed on the uppermost plane (uppermost layer) of a display screen is supplied to weighting factor multiplier circuit 16. Weighting factor multiplier circuit 12 multiplies moving image data by weighting factor f $(1-\alpha1)$ $(1-\alpha2)$, weighting factor multiplier circuit 15 multiplies OSD data by weighting factor $\alpha1$ $(1-\alpha2)$, and weighting factor multiplier circuit 16 multiplies OSD data by weighting factor $\alpha2$.

Here again, coefficient f in weighting factor f $(1-\alpha1)$ $(1-\alpha2)$ has a value determined according to the resolution of a display unit on which an image is reproduced and varies depending on the magnification used for scaling by scaling circuit 10.

Moving image data and OSD data are supplied to image data output device 2000 of the structure described above in a similar manner to that of the first embodiment. The moving image data is first scaled by scaling circuit 10 according to the resolution of a display unit on which an image is reproduced. The moving image data scaled by scaling circuit 10 is multiplied, if the moving image data is for a pixel position where an image derived from OSD data is displayed, by weighting factor f $(1-\alpha1)$ $(1-\alpha2)$ by weighting factor multiplier circuit 12.

On the other hand, OSD data are first supplied to OSD data combining circuit 11 where two OSD data are weighted and then added together to produce composite OSD data. In OSD data combining circuit 11, OSD data representing an image to be displayed on a lower plane (lower layer) of the display unit is supplied to weighting factor multiplier circuit 15 to be multiplied by weighting factor $\alpha1$ $(1-\alpha2)$ and OSD data representing an image to be displayed on a higher plane (higher layer) is supplied to weighting factor multiplier circuit 16 to be multiplied by weighting factor $\alpha2$. The resultant two OSD data multiplied by respective weighting factors are supplied from weighting factor multiplier circuits 15 and 16 to adder circuit 17 to be combined into one composite OSD data, and the composite OSD data is provided to scaling circuit 13 and scaled.

The moving image data from weighting factor multiplier circuit 12 and the OSD data from scaling circuit 13 are supplied to combining circuit 14 in synchronization with each other so that the moving image data and OSD data for the same pixel position are provided to combining circuit 14. Combining circuit 14 accordingly outputs only moving image data as image data for a pixel position where no image derived from OSD data is displayed and outputs composite data, which has been produced by adding OSD data to moving image data, as image data for a pixel position where an image derived from OSD data is displayed. Then, the image derived from OSD data is displayed with a darkened background.

According to the first and second embodiments, moving image data for a pixel position where no image derived from OSD data is displayed is not multiplied by the weighting factor. However, the entire moving image data may be multiplied by the weighting factor so that a displayed image represented by the moving image data is entirely darkened, in order to allow an image derived from OSD data to clearly be shown.

Third Embodiment

Figure 3:
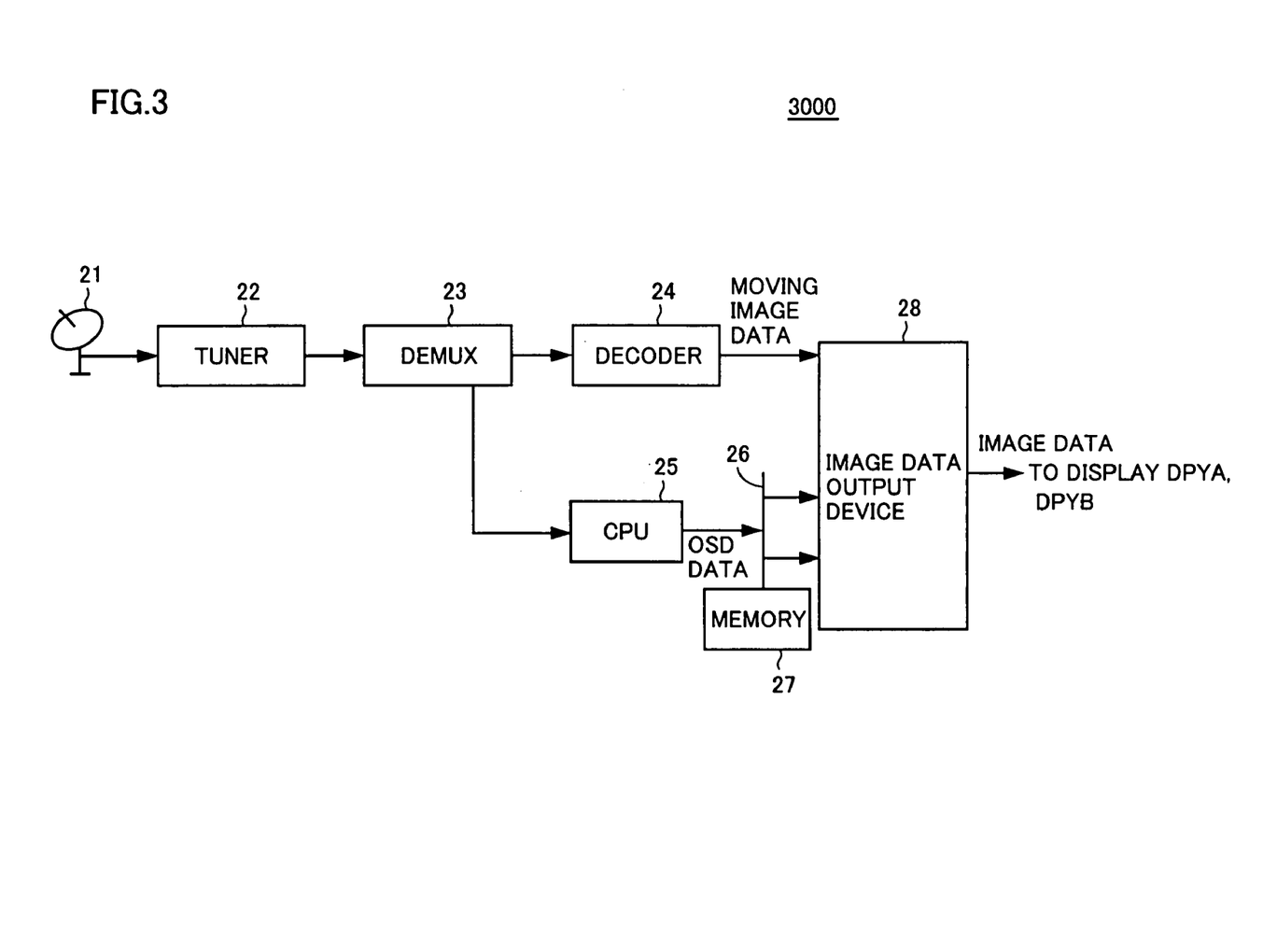
FIG. 3 is a block diagram showing an internal structure of a receiving device 3000.

FIG. 3 is a schematic block diagram showing a structure of a receiving device 3000 according to a third embodiment of the present invention.

Receiving device 3000 of the third embodiment includes an image data output device corresponding to image data output device 1000 or 2000 according to the present invention. Receiving device 3000 can output image data to a plurality of display units with respective resolutions different from each other as described below.

It is assumed here that receiving device 3000 outputs image data to two display units DPYA and DPYB having different resolutions for the purpose of allowing the following description to be understood easily. However, the receiving device according to the present invention can be structured to output image data to a greater number of display units having different resolutions. Alternatively, the receiving device of the present invention can be structured to output composite image data of an image to be displayed on one of display units having different resolutions that is connected to the receiving device, the composite image data being constituted of OSD data and moving image data appropriately changed according to the resolution of the display unit connected to the receiving device.

Receiving device 3000 shown in FIG. 3 includes an antenna 21, a tuner 22 receiving a broadcast signal via antenna 21, a demultiplexer 23 separating the broadcast signal sent from tuner 22 into a signal for moving image data and a signal for OSD data, an MPEG (Moving Picture Experts Group) decoder 24 decoding an MPEG-coded signal supplied from demultiplexer 23 to generate moving image data, a CPU 25 processing a signal supplied from demultiplexer 23 to generate a plurality of OSD data, a bus line 26, a memory 27 receiving OSD data generated by CPU 25 via bus 26, and an image data output device 28 combining OSD data stored in memory 27 and moving image data generated by MPEG decoder 24 and outputting the resultant composite data to display units DPYA and DPYB (not shown).

An operation of receiving device 3000 is explained below.

In receiving device 3000, a broadcast signal received by antenna 21 and tuner 22 is provided to demultiplexer 23 where multiplexed moving image data signal and OSD data signal are separated into two signals to be supplied to MPEG decoder 24 and CPU 25 respectively. MPEG decoder 24 decodes MPEG-coded moving image data signal to generate moving image data while CPU 25 processes the OSD data signal to generate a plurality of OSD data representing respective images.

In this way, the moving image data and a plurality of OSD data are generated, a plurality of OSD data are stored in memory 27 via bus line 26, and the moving image data is provided to image data output device 28. Those OSD data stored in memory 27 are provided to image data output device 28 via bus line 26.

Accordingly, a plurality of OSD data and moving image data are sent to image data output device 28, and then composite image data constituted of the OSD data and moving image data is output so that an image displayed according to those OSD data is presented on an upper plane (upper layer) than a plane (layer) on which an image displayed according to the moving image data is presented. In image data output device 28, moving image data and OSD data are scaled in order to output image data appropriate for two display units having different resolutions.

Figure 4:
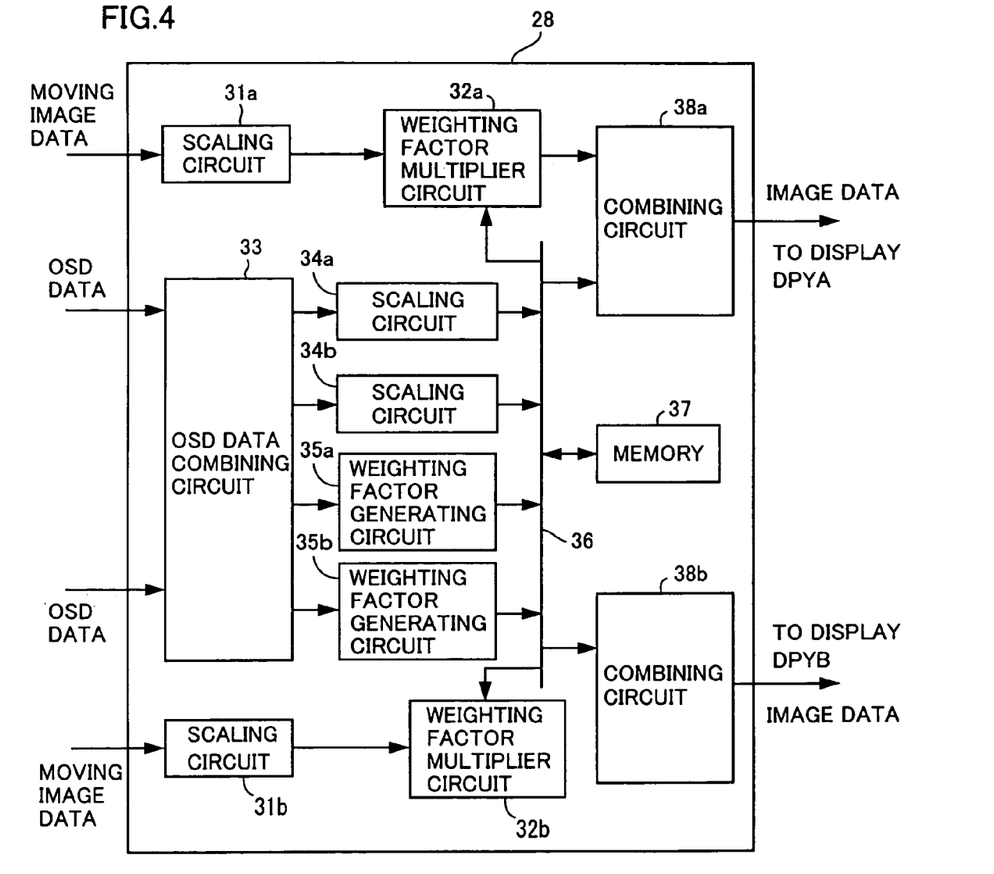
FIG. 4 is a block diagram showing an internal structure of an image data output device 28 provided in the receiving device shown in FIG. 3.

FIG. 4 is a block diagram showing an internal structure of image data output device 28 provided in receiving device 3000 shown in FIG. 3.

Image data output device 28 in FIG. 4 has components used for the same purpose as that of the image data output device in FIG. 2. Such components common to the devices in FIGS. 4 and 2 are denoted by the same reference character and detailed description thereof is not repeated here.

Data output device 28 shown in FIG. 4 includes scaling circuits 31a and 31b scaling moving image data, weighting factor multiplier circuits 32a and 32b multiplying the moving image data supplied respectively from scaling circuits 31a and 31b by respective weighting factors, an OSD data combining circuit 33 weighting and adding together two OSD data to generate composite OSD data, scaling circuits 34a and 34b scaling OSD data supplied from OSD data combining circuit 33, weighting factor generating circuits 35a and 35b generating respective weighting factors used for multiplication by weighting factor multiplier circuits 32a and 32b, the weighting factors being generated based on weighting factors by which OSD data are multiplied in OSD data combining circuit 33, a bus line 36, a memory receiving the OSD data scaled by scaling circuits 34a and 34b as well as the weighting factors generated by weighting factor generating circuits 35a and 35b, a combining circuit 38a combining OSD data stored in memory 37 with moving image data sent from weighting factor multiplier circuit 32a, and a combining circuit 38b combining OSD data stored in memory 37 with moving image data sent from weighting factor multiplier circuit 32b.

In image data output device 28 structured as explained above, scaling circuit 31a, weighting factor multiplier circuit 32a, scaling circuit 34a, weighting factor generating circuit 35a and combining circuit 38a operate to generate image data to be supplied to display unit DPYA. Scaling circuit 31b, weighting factor multiplier circuit 32b, scaling circuit 34b, weighting factor generating circuit 35b and combining circuit 38b operate to generate image data to be supplied to display unit DPYB.

Figure 5:
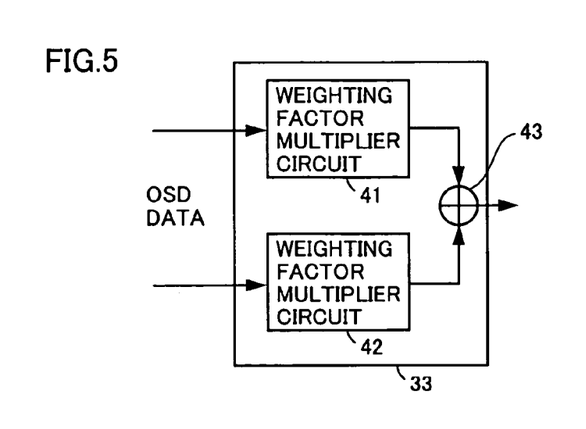
FIG. 5 is a block diagram showing an internal structure of an OSD data combining circuit 33 provided in the image data output device 28 shown in FIG. 4.

FIG. 5 is a schematic block diagram illustrating a structure of OSD data combining circuit 33.

Referring to FIG. 5, OSD data combining circuit 33 includes, similarly to OSD data combining circuit 11 of the second embodiment, weighting factor multiplier circuits 41 and 42 receiving two OSD data respectively representing two separate images from memory 27 via bus line 26, and an adder circuit 43 adding together the data multiplied by respective weighting factors by weighting factor multiplier circuits 41 and 42. In this OSD data combining circuit 33, weighting factor multiplier circuit 41 multiplies one OSD data by weighting factor $\alpha 1$ $(1-\alpha 2)$ and weighting factor multiplier circuit 42 multiplies the other OSD data by weighting factor $\alpha 2$.

In image data output device 28 structured as described above, two OSD data stored in memory 27 are supplied via bus line 26 to OSD data combining circuit 33. The two OSD data are then multiplied by respective weighting factors and added together to generate one composite OSD data. The resultant composite OSD data generated by OSD data combining circuit 33 is supplied to scaling circuits 34a and 34b to be scaled according to different resolutions of two displays respectively. Weighting factor generating circuits 35a and 35b generate respective weighting factors f1 $(1-\alpha 1)$ $(1-\alpha 2)$ and f2 $(1-\alpha 1)$ $(1-\alpha 2)$ to be supplied to weighting factor multiplier circuits 32a and 32b based on respective weighting factors $(1-\alpha 1)$ and $(1-\alpha 2)$ by which OSD data are multiplied by OSD data combining circuit 33. Coefficient f1 has a value appropriate for the resolution of display unit DPYA and coefficient f2 has a value appropriate for the resolution of display unit DPYB.

The two OSD data for display that are scaled by scaling circuits 34a and 34b as well as weighting factors f1 $(1-\alpha 1)$ $(1-\alpha 2)$ and f2 $(1-\alpha 1)$ $(1-\alpha 2)$ generated by weighting factor generating circuits 35a and 35b are supplied to memory 37 via bus line 36.

The OSD data and weighting factor f1 $(1-\alpha 1)$ $(1-\alpha 2)$ for display unit DPYA and the OSD data and weighting factor f2 $(1-\alpha 1)$ $(1-\alpha 2)$ for display unit DPYB are stored in separate regions designated in memory 37.

When the OSD data are accordingly stored in memory 37 and a request is made to display images represented by the stored OSD data, weighting factors f1 $(1-\alpha 1)$ $(1-\alpha 2)$ and f2 $(1-\alpha 1)$ $(1-\alpha 2)$ stored in memory 37 are provided to weighting factor multiplier circuits 32a and 32b. Then, weighting factor multiplier circuits 32a and 32b multiply moving image data scaled by scaling circuits 31a and 31b by respective weighting factors f1 $(1-\alpha 1)$ $(1-\alpha 2)$ and f2 $(1-\alpha 1)$ $(1-\alpha 2)$.

The moving image data multiplied by respective weighting factors by weighting factor multiplier circuits 32a and 32b are sent to combining circuits 38a and 38b as those for display units DPYA and DPYB. Simultaneously, the OSD data for display units DPYA and DPYB stored in memory 37 are sent to combining circuits 38a and 38b via bus line 36.

Combining circuit 38a combines the moving image data and OSD data for display unit DPYA to generate image data while combining circuit 38b combines the moving image data and OSD data for display unit DPYB to generate image data. The image data generated by combining circuits 38a and 38b are output to display units DPYA and DPYB respectively.

If there is no image represented by OSD data to be displayed and thus only an image represented by moving image data is to be displayed, the moving image data scaled by scaling circuits 31a and 31b are not multiplied by weighting factors by weighting factor multiplier circuits 32a and 32b and thus the moving image data are not suppressed. Only the moving image data scaled by scaling circuits 31a and 31b are thus output as image data via combining circuits 38a and 38b.

In order to supply moving image data and OSD data for the same pixel position to each of combining circuits 38a and 38b, moving image data from weighting factor multiplier circuits 32a and 32b and OSD data stored in memory 37 are provided in synchronization with each other to combining circuits 38a and 38b.

The structure of image data output device 28 as explained above is not required to have OSD data combining circuits 33 for respective displays having different resolutions so that only one OSD data combining circuit may be provided. Moreover, composite OSD data generated by OSD data combining circuit 33 can be superimposed on each other and recorded in memory so as to reduce the size of the image data output device.

In this way, according to the present invention, smoothly changing image data such as moving image data is scaled first and subsequently multiplied by a weighting factor. Therefore, when the moving image data is scaled, the moving image data has a smaller number of edge portions than image data which has been multiplied by the weighting factor. Deterioration of an image such as overshoot and undershoot can thus be lessened. Moreover, image data having numerous edge portions such as OSD data is first multiplied by a weighting factor and subsequently scaled. Therefore, when the OSD data is scaled, the OSD data has a smaller difference of data values for edge portions than that of OSD data scaled before the weighting factor is multiplied. It is thus possible to lessen image deterioration by reducing overshoot and undershoot values for example. Image data processed as described above are combined to generate composite data and accordingly it is possible for the composite data to be reproduced on an image display unit with an excellent image quality.

Modification of the Third Embodiment

Figure 6:
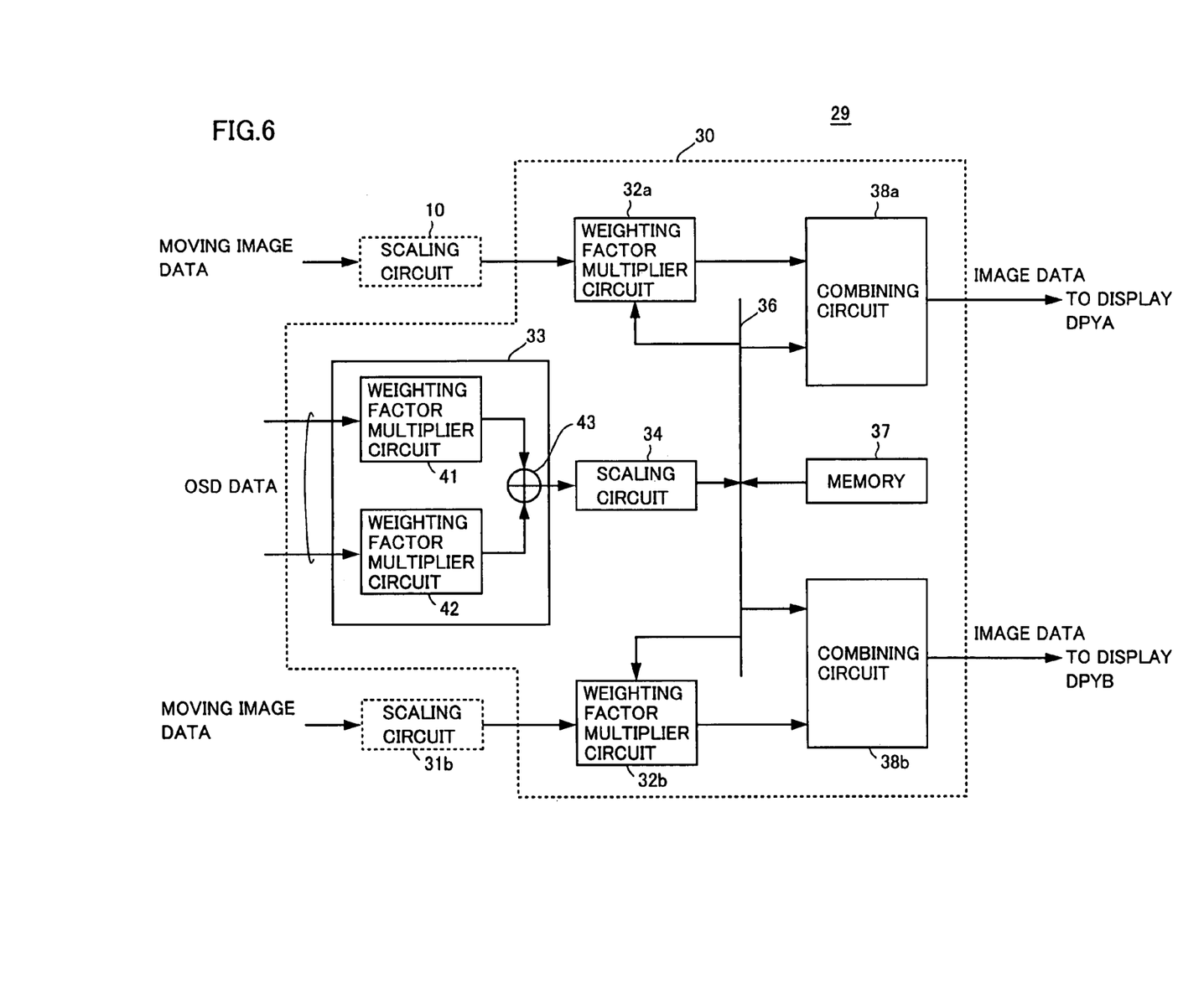
FIG. 6 is a block diagram showing an internal structure of an image data output device 29 according to a modification of the third embodiment of the present invention.

FIG. 6 is a block diagram showing an internal structure of an image data output device 29 which can be provided in receiving device 3000 shown in FIG. 3 instead of image data output device 28 of the third embodiment.

The image data output device in FIG. 6 has components used for the same purpose as that of the image data output device 28 in FIG. 4, and such components common to these devices are denoted by the same reference character.

Image data output device 29 shown in FIG. 6 includes scaling circuits 31a and 31b for scaling moving image data, and an image output combining unit 30 receiving respective outputs of scaling circuits 31a and 31b and OSD data to generate image data to be supplied to display units DPYA and DPYB. Image output combining unit 30 here can be formed of an LSI on one chip for example.

Image output combining unit 30 includes weighting factor multiplier circuits 32a and 32b multiplying moving image data supplied from respective scaling circuits 31a and 31b by weighting factors, an OSD data combining circuit 33 weighting and then adding together two OSD data to generate composite OSD data, a scaling circuit 34 scaling the OSD data supplied from OSD data combining circuit 33, a bus line 36, a memory 37 receiving the OSD data scaled by scaling circuit 34 and weighting factors by which the OSD data are multiplied by OSD data combining circuit 33, a combining circuit 38a combining OSD data stored in memory 37 and moving image data supplied from weighting factor multiplier circuit 32a, and a combining circuit 38b combining OSD data stored in memory 37 and moving image data supplied from weighting factor multiplier circuit 32b.

In image output combining unit 30, weighting factor multiplier circuit 32a, scaling circuit 34 and combining circuit 38a operate to generate image data to be supplied to display unit DPYA. Weighting factor multiplier circuit 32b, scaling circuit 34 and combining circuit 38b operate to generate image data to be supplied to display unit DPYB. Namely, scaling circuit 34 in image data output device 29 can perform scaling on OSD data differently depending on different resolutions of respective display units.

For data to be output to any of display units DPYA and DPYB, no scaling may be performed by scaling circuit 31a or 31b. In other words, scaling circuit 31a for example may be eliminated from FIG. 6 so that data to be output to display unit DPYA undergoes no scaling and is just multiplied by a weighting factor and then combined with an output from scaling circuit 34.

OSD data combining circuit 33 includes, similarly to OSD data combining circuit 33 of the third embodiment, a weighting factor multiplier circuit 41 multiplying one OSD data by weighting factor α1 (1+α2) and a weighting factor multiplier circuit 42 multiplying the other OSD data by weighting factor α2.

In image data output device 29 having the structure as described above, two OSD data stored in memory 27 are provided via bus line 26 to OSD data combining circuit 33 where the two OSD data are weighted and added together so that one composite OSD data is generated. The composite OSD data generated by OSD data combining circuit 33 is supplied to scaling circuit 34 where OSD data is scaled according to different resolutions of the two display units, and resultant data are stored in memory 37.

Scaling circuit 34 also performs scaling based on weighting factors (1−α1) and (1−α2) by which OSD data are multiplied by OSD data combining circuit 33 to generate respective weighting factors to be supplied to weighting factor multiplier circuits 32a and 32b.

Two OSD data for display that are scaled by scaling circuit 34 are supplied via bus line 36 to memory 37.

Memory 37 accordingly stores in separate regions defined therein the OSD data and weighting factor for display unit DPYA and the OSD data and weighting factor for display unit DPYB.

When the OSD data are thus stored in memory 37 and a request is made to display images by means of the stored OSD data, weighting factors stored in memory 37 are provided respectively to weighting factor multiplier circuits 32a and 32b. Weighting factor multiplier circuits 32a and 32b multiply moving image data from respective scaling circuits 31a and 31b by the weighting factors.

The moving image data thus multiplied by the weighting factors by weighting factor multiplier circuits 32a and 32b are sent, as moving image data for display units DPYA and DPYB, to combining circuits 38a and 38b respectively. The OSD data for display units DPYA and DPYB stored in memory 37 are also sent via bus line 36 to combining circuits 38a and 38b.

Combining circuit 38a combines the moving image data and OSD data for display DPYA to generate composite image data while combining circuit 38b combines the moving image data and OSD data for display DPYB to generate composite image data. The image data generated accordingly by combining circuits 38a and 38b are output to display units DPYA and DPYB respectively.

Here, a plurality of OSD data are supplied to OSD data combining circuit 33 where these OSD data are multiplied by respective weighting factors and then combined. However, only one type of OSD data may be supplied to OSD data combining circuit 33 where the OSD data is multiplied by a weighting factor and then output.

The structure of image data output device 29 is similar to image data output device 28 shown in FIG. 4 except for the details discussed above. Image data output device 29 as structured above can also achieve advantages similar to those of the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data output device receiving first image data representing a moving image and second image data representing an image including characters and graphics to output an image signal corresponding to a composite image generated by combining said first and second image data, comprising:

a first image data processing circuit scaling said first image data and thereafter weighting said scaled first image data;

a second image data processing circuit weighting said
   second image data and thereafter scaling said weighted
   second image data; and
a first combining circuit combining said first image data
   processed by said first image data processing circuit
   and said second image data processed by said second
   image data processing circuit,
wherein first image data includes a moving image and
   second image data includes characters and graphics but
   no moving image,
wherein scaling the first image data having the moving
   image and thereafter weighting the first image data
   having scaled moving image data and weighting the
   second image data having characters and graphics and
   thereafter scaling said second image data having
   weighted image data having characters and graphics,
wherein changing the order of scaling and weighting
   depending on the type of data being analyzed.

2. The image data output device according to claim 1, wherein
   a weighting factor used by said first image data processing
      circuit is scaled according to resolution of an image
      display unit.

3. An image data output device receiving first image data representing a moving image and second image data representing an image including characters and graphics to output an image signal corresponding to a composite image generated by combining said first and second image data, comprising:
   a first image data processing circuit scaling said first
      image data and thereafter weighting said scaled first
      image data;
   a second image data processing circuit weighting said
      second image data and thereafter scaling said weighted
      second image data; and
   a first combining circuit combining said first image data
      processed by said first image data processing circuit
      and said second image data processed by said second
      image data processing circuit, wherein
   said first image data processing circuit includes
   a first scaling circuit scaling said first image data and
   a weighting factor multiplier circuit weighting said first
      image data scaled by said first scaling circuit,
   said second image data processing circuit includes
   a second combining circuit receiving said second image
      data for weighting at least one image data constituting
      said second image data and combining the weighted
      image data to generate one composite image data and
   a second scaling circuit scaling the composite image data
      generated by said second combining circuit, and
   said first combining circuit combines the image data
      supplied from said weighting factor multiplier circuit
      and the image data supplied from said second scaling
      circuit.

4. The image data output device according to claim 3, wherein
   said second combining circuit weighting and then adding
      together a plurality of image data constituting said
      second image data for combining said plurality of
      image data.

5. The image data output device according to claim 3, wherein
   a weighting factor used by said weighting factor multiplier circuit is scaled according to resolution of an
      image display unit.

6. An image data output device receiving first image data representing a moving image and second image data representing an image including characters and graphics to output an image signal corresponding to a composite image generated by combining said first and second image data, said image signal being output to represent a plurality of data according to respective resolutions of a plurality of image display units, comprising:
   a plurality of first scaling circuits scaling said first image
      data according to respective resolutions of said plurality of image display units;
   a plurality of weighting factor multiplier circuits multiplying said first image data scaled by said plurality of
      first scaling circuits by respective weighting factors;
   a first combining circuit receiving said second image data
      for weighting at least one image data constituting said
      second image data and combining the weighted image
      data to generate one composite image data;
   a second scaling circuit scaling the composite image data
      generated by said first combining circuit according to
      respective resolutions of said plurality of image display
      units; and
   a plurality of second combining circuits combining image
      data supplied respectively from said plurality of
      weighting factor multiplier circuits and image data
      supplied from said second scaling circuit to generate
      and output composite image data according to respective resolutions of said plurality of image display units.

7. The image data output device according to claim 6, further comprising a memory storing the image data scaled by said second scaling circuit.

8. The image data output device according to claim 6, wherein
   weighting factors used by said weighting factor multiplier
      circuits respectively are scaled according to respective
      resolutions of said image display units.

9. An image data output device outputting image data as a plurality of data according to respective resolutions of a plurality of image display units, comprising:
   a plurality of first weighting factor multiplier circuits
      respectively multiplying, by respective weighting factors, first image data to be output respectively for said
      plurality of image display units and representing a
      moving image;
   a second weighting factor multiplier circuit multiplying
      second image data representing an image including
      characters and graphics by a weighting factor;
   a scaling circuit scaling the image data supplied from said
      second weighting factor multiplier circuit according to
      respective resolutions of said plurality of image display
      units; and
   a plurality of combining circuits combining image data
      supplied respectively from said plurality of first weighting factor multiplier circuits and image data supplied
      from said scaling circuit to generate and output composite image data according to respective resolutions of
      said plurality of image display units.

10. A receiving device comprising:
   a tuner selectively receiving a signal transmitting first
      image data representing a moving image and second
      image data representing an image including characters
      and graphics;
   a separating unit separating the received signal into a
      signal corresponding to said first image data and a
      signal corresponding to said second image data;
   a first and second data generate units generate said first
      and second image data respectively from an output of
      said separating unit; and an image data output device receiving said first and second image data from said first and second data generate units to output an image signal corresponding to a composite image generated by combining said first and second image data, said image data output device including a first image data processing circuit scaling said first image data and thereafter weighting said scaled first image data, a second image data processing circuit weighting said second image data and thereafter scaling a multiplied second image data, and a first combining circuit combining said first image data processed by said first image data processing circuit and said second image data processed by said second image data processing circuit, wherein scaling the first image data having the moving image and thereafter weighting the first image data having scaled moving image data and weighting the second image data having characters and graphics and thereafter scaling said second image data having weighted image data having characters and graphics, wherein changing the order of scaling and weighting depending on the type of data being analyzed.

11. The receiving device according to claim 10, wherein a weighting factor used by said first image data processing circuit is scaled according to resolution of an image display unit.

12. A receiving device comprising:

a tuner selectively receiving a signal transmitting first image data representing a moving image and second image data representing an image including characters and graphics;

a separating unit separating the received signal into a signal corresponding to said first image data and a signal corresponding to said second image data;

a first and second data generate units generate said first and second image data respectively from an output of said separating unit; and an image data output device receiving said first and second image data from said first and second data generate units to output an image signal corresponding to a composite image generated by combining said first and second image data, said image data output device including a first image data processing circuit scaling said first image data and thereafter weighting said scaled first image data, a second image data processing circuit weighting said second image data and thereafter scaling a multiplied second image data, and a first combining circuit combining said first image data processed by said first image data processing circuit and said second image data processed by said second image data processing circuit, wherein said first image data processing circuit includes a first scaling circuit scaling said first image data and a weighting factor multiplier circuit weighting said first image data scaled by said first scaling circuit, said second image data processing circuit includes a second combining circuit receiving said second image data for weighting at least one image data constituting said second image data and combining the weighted image data to generate one composite image data and a second scaling circuit scaling the composite image data generated by said second combining circuit, and said first combining circuit combines the image data supplied from said weighting factor multiplier circuit and the image data supplied from said second scaling circuit.

13. The receiving device according to claim 12, wherein said second combining circuit weighting and then adding together a plurality of image data constituting said second image data for combining said plurality of image data.

14. The receiving device according to claim 12, wherein a weighting factor used by said weighting factor multiplier circuit is scaled according to resolution of an image display unit.

15. A receiving device comprising:

a tuner selectively receiving a signal transmitting first image data representing a moving image and second image data representing an image including characters and graphics;

a separating unit separating the received signal into a signal corresponding to said first image data and a signal corresponding to said second image data;

a decoding unit reproducing said first and second image data from an output of said separating unit; and an image data output device receiving said first and second image data from said decoding unit to output an image signal corresponding to a composite image generated by combining said first and second image data, said image signal being output to represent a plurality of data according to respective resolutions of a plurality of image display units, said image data output device including a plurality of first scaling circuits scaling said first image data according to respective resolutions of said plurality of image display units, a plurality of weighting factor multiplier circuits multiplying said first image data scaled by said plurality of first scaling circuits by respective weighting factors, a first combining circuit receiving said second image data for weighting at least one image data constituting said second image data and combining the weighted image data to generate one composite image data, a second scaling circuit scaling the composite image data generated by said first combining circuit according to respective resolutions of said plurality of image display units, and a plurality of second combining circuits combining image data supplied respectively from said plurality of weighting factor multiplier circuits and image data supplied from said second scaling circuit to generate and output composite image data according to respective resolutions of said plurality of image display units.

16. The receiving device according to claim 15, wherein said image data output device further includes a memory storing the image data scaled by said second scaling circuit.

17. The receiving device according to claim 15, wherein weighting factors used by said weighting factor multiplier circuits respectively are scaled according to respective resolutions of said image display units.

* * * * *